US005355583A

United States Patent [19]

Osumi et al.

[11] Patent Number: 5,355,583

[45] Date of Patent: Oct. 18, 1994

[54] METHOD AND APPARATUS FOR INSERTING TERMINAL

[75] Inventors: Yoshihisa Osumi; Hiroo Suzuki; Takao Nakagame, all of Gotenba, Japan

[73] Assignee: Yazaki Corporation, Tokyo, Japan

[21] Appl. No.: 96,968

[22] Filed: Jul. 27, 1993

[30] Foreign Application Priority Data

Jul. 28, 1992 [JP] Japan .................................. 4-201148

[51] Int. Cl.$^{5}$ ........................ H01R 43/20; B23P 19/00

[52] U.S. Cl. ........................................ 29/876; 29/759; 29/749; 29/866; 29/33 M; 439/597; 439/599

[58] Field of Search .............. 29/866, 33 M, 749, 759, 29/876, 748; 439/597, 598, 599

[56] References Cited

U.S. PATENT DOCUMENTS 3,538,489 11/1970 Bennett et al. ................. 439/748 X
3,569,900 3/1971 Uberbacker ..................... 439/748 X
4,243,288 1/1981 Lucius et al. .
4,343,085 8/1982 Lucius et al. .......................... 29/866
4,486,950 12/1984 Weidler ................................ 29/866
4,590,650 5/1986 Brown et al. ....................... 29/33 M
4,718,159 1/1988 Bronkowski et al. ............ 29/749 X
4,767,361 8/1988 Hoshino et al. ................ 439/597 X
4,965,923 10/1990 Kumazawa ....................... 29/749 X
5,122,077 6/1992 Maejima et al. .

FOREIGN PATENT DOCUMENTS 1-03194 6/1985 Japan .
3-38708 6/1991 Japan .

*Primary Examiner*—Carl J. Arbes
*Attorney, Agent, or Firm*—Venable, Baetjer, Howard & Civiletti

[57] ABSTRACT

A method and an apparatus for smoothly and securely inserting a terminal connected to an electric wire into a terminal accommodating chamber within a connector housing from an opening in a notched rear end portion of the housing. The housing has an interior divided by partition walls into a plurality of terminal accommodating chambers each having a rear end defining an opening through which the terminal can be inserted, a notched shoulder portion formed in each partition wall at at least one of joints between the partition wall and top and bottom walls of the housing, and a terminal retaining cover capable of opening away from and closing onto the notched shoulder portions. A guide wall capable of engaging with the notched shoulder portions when the terminal retaining cover is open, thereby defining a flame-shaped terminal insertion opening, allows the terminal to be inserted through the terminal insertion opening. Thus, the terminal being inserted is prevented from being caught on the top or bottom wall of the housing.

11 Claims, 2 Drawing Sheets

METHOD AND APPARATUS FOR INSERTING TERMINAL

BACKGROUND OF THE INVENTION

1. Field of the Invention

The present invention relates to a method and an apparatus for inserting a terminal connected to one end of an electric wire into a connector housing, and particularly, to a method and an apparatus that enables such a wire-connected terminal to be automatically inserted smoothly and securely into a terminal accommodating chamber within the connector housing from an opening in a notched rear end portion of the connector housing.

2. Description of the Related Art

Japanese Patent Publication No. 1-13194 discloses a method and an apparatus for automatically inserting a wire-connected terminal into a terminal accommodating chamber within a connector housing from an opening in one end portion of the connector housing (in the rear end portion thereof with regard to the direction of insertion). The connector housing has an interior divided by partition walls into a plurality of terminal accommodating chambers, and each terminal accommodating chamber has an outer end defining an opening capable of constituting an opening through which a wire-connected terminal is inserted. At the portion where the openings are formed, notched shoulder portions are formed in the partition walls at their joints with the top and bottom walls of the housing. The connector housing also has a terminal retaining cover capable of opening away from and closing onto the notched shoulder portions. A wire-connected terminal is inserted into a terminal accommodating chamber in the following manner: the connector housing is retained by a retainer, and front and rear portions of the wire-connected terminal, that is, the electrical contact portion at the leading end and the electric wire at the trailing end, are simultaneously held by a front terminal-holder and a rear terminal-holder, respectively; the wire-connected terminal is brought to the relevant opening at the rear end of the connector housing; and when the leading end of the terminal has entered the opening, the front terminal-holder is separated (usually by moving the holder upward), and only the rear terminal-holder is used to push the terminal into the terminal accommodating chamber. The terminal retaining cover, which is integrated with the housing by a hinge, is brought into contact and engaged with the trailing end portion of the inserted terminal to retain the same.

With the disclosed art, when the leading end of the terminal has entered into the interior of the housing, the leading end may collide with the top wall or the bottom wall at a notched shoulder portion of the connector housing. As a result, the terminal may not be inserted properly sometimes.

SUMMARY OF THE INVENTION

In view of the above-described problem, an object of the present invention is to provide a method and an apparatus for inserting a terminal that is capable of preventing a terminal which is being inserted from being caught at the notched portion at the rear end portion of the connector housing, and hence, preventing the insertability of the terminal from being impaired.

In order to achieve the above object, according to one aspect of the present invention, there is provided a method for inserting a terminal into a connector housing having an interior divided by partition walls into a plurality of terminal accommodating chambers each having an outer end defining an opening capable of constituting an opening through which the terminal is inserted, a notched shoulder portion formed in each partition wall at at least one of joints between the partition wall and top and bottom walls of the connector housing, and a terminal retaining cover capable of opening away from and closing onto the notched shoulder portions. The method comprises the steps of: positioning a guide wall for engaging with the notched shoulder portions and for defining a frame-shaped terminal insertion opening when the terminal retaining cover is open; and inserting the terminal into the connector housing through the terminal insertion opening.

When inserting a terminal, a terminal insertion guide is disposed opposing an opened rear end portion of the connector housing. The terminal insertion guide has a guide wall capable of engaging with the notched shoulder portions at the opened rear-end portion; the guide wall defines, when engaged with the notched shoulder portions, a flame-shaped opening for inserting the terminal. By virtue of the guide wall, the terminal is prevented from being caught at the notched shoulder portions, and can be inserted smoothly and securely into one of the terminal accommodating chambers.

According to another aspect of the present invention, there is provided an apparatus for inserting a terminal into a connector housing of the above-described type. The apparatus comprises: at least one terminal insertion guide for being disposed opposing an opened rear end portion of the connector housing, the terminal insertion guide having a guide wall capable of engaging with the notched shoulder portions, the guide wall defining, when engaged with the notched shoulder portions, a frame-shaped terminal insertion opening at the opened rear end of the connector housing; and means for holding the terminal and for causing the terminal to advance through the frame-shaped terminal insertion opening from behind the terminal insertion opening.

The above and other objects of the present invention will be apparent from the following description of embodiments of terminal insertion methods according to the present invention when the same is read with reference to the accompanying drawings.

DESCRIPTION OF THE PREFERRED EMBODIMENTS

Figure 1:
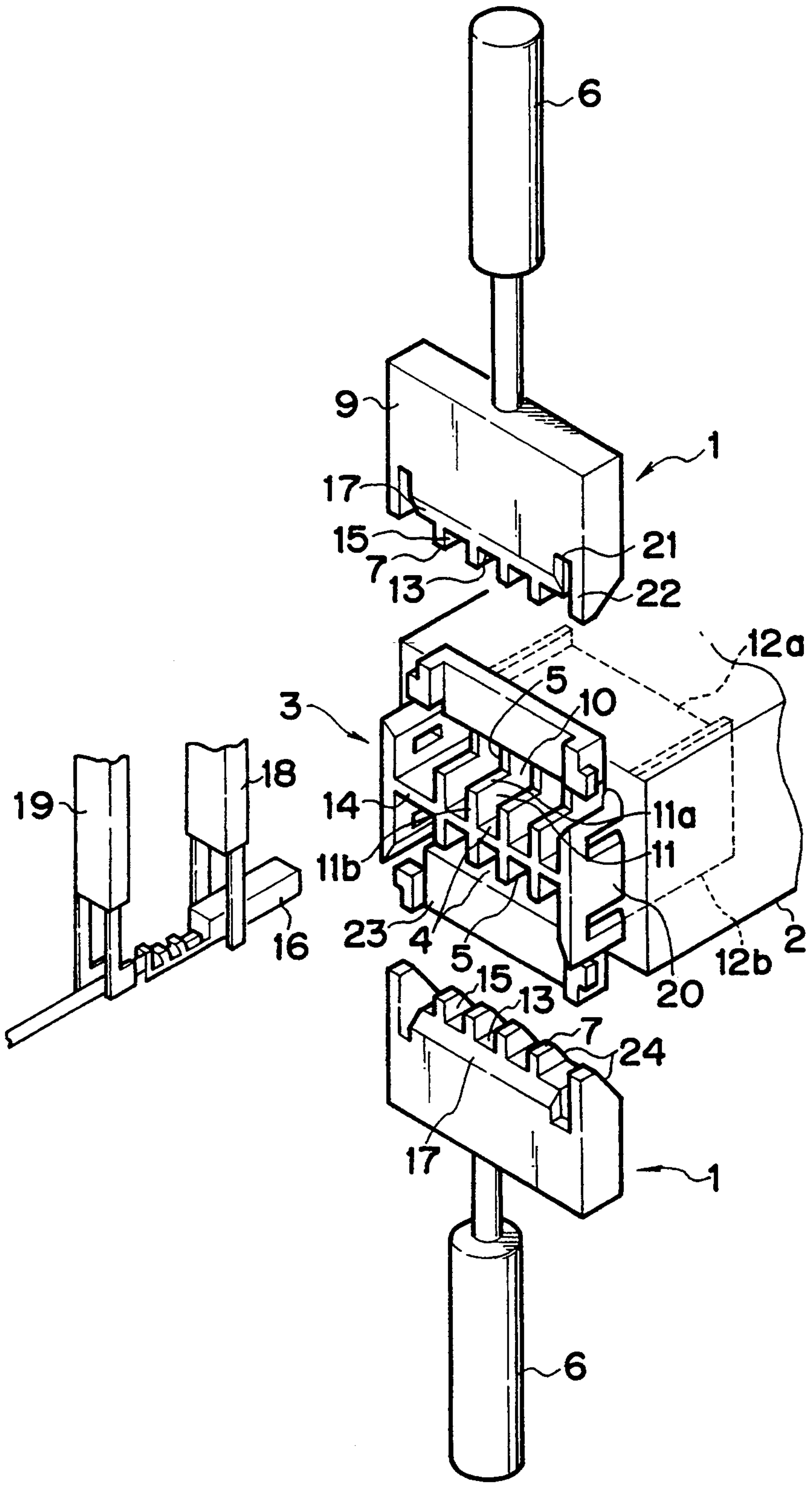
FIG. 1 is a perspective view of various members including terminal insertion guide members that are shown in an exploded perspective view, provided for illustrating an embodiment of a terminal insertion method according to the present invention.

Referring to FIG. 1, a connector housing 3 into which a terminal may be inserted according to the present invention has a top wall 12*a*, a bottom wall 12*b* and side walls 20, and is opened at one end portion thereof which is located rearward with regard to the direction of insertion. The housing 3 has an interior divided into a plurality of terminal accommodating chambers 10 by a central partition wall 14 extending horizontally at the center of the height of the side walls 20 and a plurality of vertical partition walls 11 each extending vertically between the top wall 12*a* and the bottom wall 12*b*. Each terminal accommodating chamber 10 has a rear end defining an opening 4 capable of constituting an opening through which a terminal is inserted. Notched shoulder portions 5 are formed in each vertical partition wall 11 at joints between the partition wall 11 and the top and bottom walls 12*a* and 12*b*. The housing 3 also has a terminal retaining cover 23 capable of opening away from and closing onto the notched shoulder portions 5. When a terminal 16 connected to one end of an electric wire is to be inserted into the connector housing 3, the connector housing 3 is retained by a retainer 2, and a terminal insertion opening 8 (see FIG. 2) is formed by using a terminal insertion guide comprising terminal insertion guide members 1. Each terminal insertion guide member 1 includes a plurality of comb-tooth-shaped guide wall elements 7 for corresponding to upper or lower notched shoulder portions 5, and can be driven vertically forward by an air cylinder 6 from above or below the opened rear end portion of the housing 3. The comb-tooth-shaped guide wall elements 7 of the terminal insertion guide members 1 are capable of engaging with the notched shoulder portions 5 to define a plurality of rectangular-frame-shaped terminal insertion openings 8 (see FIG. 2).

Figure 2:
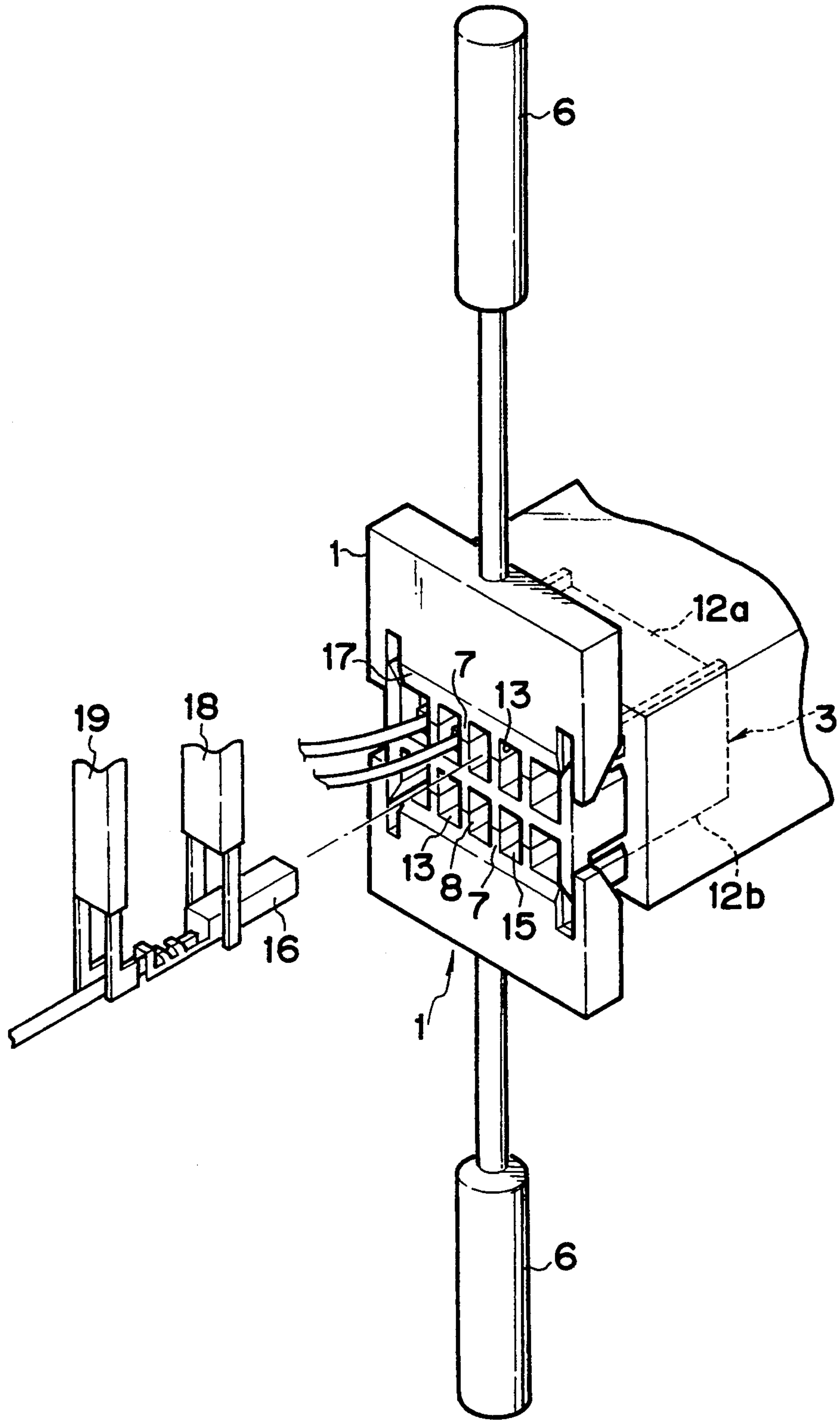
FIG. 2 is a perspective view of the members shown in FIG. 1, depicting a manner in which a terminal is inserted according to the present invention.

Each terminal insertion guide member 1 further includes a guide plate 9 made of a material such as a metal or a hard synthetic resin, and a horizontally-extending guide wall element 13 which, together with the comb-tooth-shaped vertically-extending quid wall elements 7 of the guide member 1, constitute a U-shaped terminal guide portion 15 at the forward end of the guide plate 9. When the forward end faces of the guide wall elements 7 of both guide members 1 are contacted by cylinder driving with notch faces 11*a* of the vertical partition walls 11, as shown in FIG. 2, the central partition wall 14 and the vertical partition walls 11 of the housing 3 cooperate with the U-shaped guide portions 15 of the terminal guide members 1 to define rectangular-frame-shaped terminal insertion openings 8 (in each guide portion 15, the guide wall elements 7 corresponding to the partition walls 11 while the guide wall element 13 corresponding to the top or bottom wall 12*a* or 12*b*). In this condition, the terminal 16 can be inserted smoothly through one of the terminal insertion openings 8 into the corresponding terminal accommodating chamber 10.

Each guide plate 9 include, on its side which is to confront the terminal a guide surface 17 located at a forward end portion of the guide plate 9 and inclined toward the guide wall element 13 of the guide member 1. This arrangement makes it possible to cope with a vertical shift of the wire-connected terminal 16 held by the terminal holders 18 and 19 which may be the same as conventional terminal holders. Each guide plate 9 also includes engagement grooves 21 and contact walls 22 provided on either side of the guide plate 9 and combined with each other for corresponding to the side walls 20 of the connector housing 3. This arrangement makes it possible to properly position the terminal insertion guide members 1 with respect to the connector housing 3. On the side of each guide member 1 which is to confront the housing 3, the contact walls 22 and the comb-tooth-shaped guide wall elements 7 include faces defining an inclined surface 24 for pushing open the terminal retaining cover 23 hinged to the housing 3, so as to prevent the guide member 1 from interfering with the terminal retaining cover 23 shown in FIG. 2, the cover 23 is kept open by an adequately large extent.

When the wire-connected terminal 16, being advanced by the holders 18 and 19, has entered into a desired one of the rectangular-frame-shaped openings 8 at the rear end of the connector housing 3, the front terminal-holder 18 starts ascending. The terminal 16 is thereafter inserted into the relevant terminal accommodating chamber 10 by the rear holder 19 while the front holder 18 is ascending. Smooth and secure insertion into the terminal accommodating chamber 10 is assured when the leading end of the terminal 16 has entered into the relevant rectangular-flame-shaped opening 8.

The terminal insertion guide members 1 may not necessarily be a vertically driven type, as in the above embodiment, and may alternatively be a type (not shown) hinged for rotation. Further, a rectangular-frame-shaped terminal insertion opening 8 may alternatively be formed by joining together a U-shaped guide portion 15 for corresponding to the notched shoulder portions 5 of the connector housing 3 and an inversely-U-shaped guide portion (not shown)for corresponding to both rear end faces 11*b* of the partition wall 11 and the rear end face of the central partition wall 14. Upper and lower terminal insertion guide members 1 may not necessarily be used as paired, and it is of course possible to use only one member of the pair (in the latter case, the connector housing 3 is turned upside down). Upper and lower terminal insertion guide members may not necessarily be a type comprising separate upper and lower guide members, and alternatively be a type comprising integral upper and lower guide members.

As has been described above, according to the present invention, a guide wall is used to form a frame-shaped terminal insertion opening, thereby eliminating the risk that a terminal may be caught at a notched shoulder portion of the connector housing. Therefore, it is possible to insert a terminal smoothly and securely into a connector housing, this in tern enabling the prevention of troubles such as unwanted machine stoppage during an automatic terminal insertion process.

What is claimed is:

1. A method for inserting a terminal into a connector housing having an interior divided by partition walls into a plurality of terminal accommodating chambers each having an outer end defining an opening capable of constituting an opening through which the terminal is inserted, a notched shoulder portion formed in each partition wall at at least one of joints between the partition wall and top and bottom walls of said connector housing, and a terminal retaining cover capable of opening away from and closing onto the notched shoulder portions, said method comprising the steps of: positioning a guide wall for engaging with said notched shoulder portions and for defining a flame-shaped terminal insertion opening when said terminal retaining cover is open; and inserting said terminal into said connector housing through said terminal insertion opening.

2. A method for inserting a terminal connected to an electric wire into a connector housing having a top wall, a bottom wall, an opened rear end portion located rearward with regard to the direction of insertion, an interior divided into a plurality of terminal accommodating chambers by a plurality of vertical partition walls each extending vertically between said top wall and said bottom wall, a notched shoulder portion formed at said opened rear end portion in each partition wall at at least one of joints between the partition wall and said top and bottom walls of said connector housing, and a terminal retaining cover capable of opening away from and closing onto said notched shoulder portions, said method comprising the steps of:

disposing at least one terminal insertion guide in opposition to said opened rear end portion, said terminal insertion guide having a guide wall for engaging with said notched shoulder portions, said terminal insertion guide being driven in such a manner as to bring said guide wall into engagement with said notched shoulder portions so as to define a flame-shaped terminal insertion opening; and holding said terminal and causing said terminal to advance through said terminal insertion opening from said terminal insertion opening.

3. A method according to claim 1., wherein said terminal insertion guide comprises terminal guide members capable of being disposed above and below said opened rear end portion of said connector housing, and capable of being driven vertically.

4. A method according to claim 1, wherein said terminal is connected to an electric wire, said terminal being held by front and rear holders, said front holder starting ascending when the leading end of said terminal has entered into said flame-shaped terminal insertion opening, said terminal being thereafter advanced into one of said terminal accommodating chambers by said rear holder.

5. A method according to claim 3, wherein said connector housing further has a central partition wall extending to divide said opened rear end portion into upper and lower sections and to form two rows of terminal accommodating chambers within said connector housing, and wherein said terminal insertion guide includes a U-shaped terminal guide portion comprising comb-tooth-shaped guide wall elements corresponding to said vertical partition walls of said connector housing and a horizontal guide wall element corresponding to said top wall or said bottom wall of said connector housing, said central partition wall and said vertical partition walls of said connector housing being capable of cooperating with said U-shaped terminal guide portion of said terminal insertion guide for defining a flame-shaped terminal insertion opening.

6. An apparatus for inserting a terminal connected to an electric wire into a connector housing, said connector housing having a top wall, a bottom wall, an opened rear end portion located rearward with regard to the direction of insertion, an interior divided into a plurality of terminal accommodating chambers by a plurality of vertical partition walls each extending vertically between said top wall and said bottom wall, a notched shoulder portion formed at said opened rear end portion in each partition wall at at least one of joints of the partition wall with said top and bottom walls of said connector housing, and a terminal retaining cover capable of opening away from and closing onto said notched shoulder portions, said apparatus comprising:

at least one terminal insertion guide member for being disposed in opposition to said opened rear end portion, said terminal insertion guide member having a guide wall for engaging with said notched shoulder portions, said guide wall defining, when engaged with said notched shoulder portions, a frame-shaped terminal insertion opening; and means for holding said terminal and causing said terminal to advance through from behind said frame-shaped terminal insertion opening said frame-shaped terminal insertion opening, said opening defined by the terminal insertion guide member and the connector housing.

7. An apparatus according to claim 6, wherein said terminal insertion guide includes a U-shaped terminal guide portion comprising comb-tooth-shaped guide wall elements for corresponding to said vertical partition walls of said connector housing and a horizontal guide wall element for corresponding to said top wall or said bottom wall of said connector housing.

8. An apparatus according to claim 7, wherein said connector housing further has a central partition wall extending to divide said opened rear end portion into upper and lower sections and to form two rows of terminal accommodating chambers within said connector housing, and wherein said terminal insertion guide comprises terminal guide members capable of being driven vertically onto upper and lower notched shoulder portions at said opened rear end portion of said connector housing.

9. An apparatus according to claim 6, wherein said terminal insertion guide member is attached to an air cylinder device, said terminal insertion guide member being capable of being driven by said air cylinder device into engagement with said connector housing, said terminal insertion guide member including a guide plate made of a relatively hard material and having a guide wall at the forward end thereof, said guide plate including a confronting face for confronting said terminal, said confronting face defining a guide surface inclined toward said guide wall.

10. An apparatus according to claim 9, wherein said guide plate further includes engagement grooves and contact walls on either side of said guide plate, said engagement grooves and contact walls corresponding to side walls of said connector housing.

11. An apparatus according to claim 10, wherein said contact walls and said comb-tooth-shaped guide wall elements of said terminal insertion guide have confronting faces for confronting said connector housing, said confronting faces together defining an inclined surface for pushing open said terminal retaining cover of said connector housing.

* * * * *